Patented June 3, 1952

2,598,989

UNITED STATES PATENT OFFICE 2,598,989

THIOSULFENYL DITHIOCARBAMATES AS FUNGICIDES

Lyle D. Goodhue, Bartlesville, Okla., and Winston M. Florence, Manhattan, Kans., assignors to Phillips Petroleum Company, a corporation of Delaware No Drawing. Application March 24, 1950, Serial No. 151,814

13 Claims. (Cl. 167—22)

This invention relates to new fungicides, namely, thiosulfenyl dithiocarbamates, which have been discovered to be useful for the treatment of plant diseases.

We have now discovered that thiosulfenyl dithiocarbamates are excellent fungicides. The compounds of the present invention may be represented by the following general formula

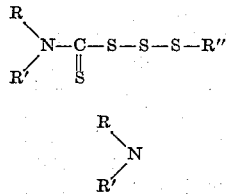

wherein $$\begin{array}{c} R \\ \diagdown \\ N \\ \diagup \\ R' \end{array}$$

is a primary or secondary amino group in which R and R' may be hydrogen, alkyl or aryl groups or radicals which together with the N form a saturated heterocyclic ring such as morpholine or piperidine, wherein said saturated heterocyclic ring contains not more than six members, wherein R'' may be an alkyl or aryl group and the sum of the R groups shall not exceed thirty carbon atoms and R, R' and R'' may be alike or different.

In the fungicide art it is well known that certain so-called functional groups are the reason for which a particular compound possesses fungicidal efficacy. Even a slight variation in the basic structure or composition of the functional group will often, if not actually always, destroy the fungicidal efficacy of the particular compound. However, variation in or substitution of the so-called non-functional or inactive groups or substituents of a fungicidal compound will not alter its nature although it may change the degree of its efficacy, making it more or less valuable as a fungicidal substance. In view of the foregoing it is essential to note that every compound according to this invention must be a thiosulfenyl dithiocarbamate and must therefore contain the functional group

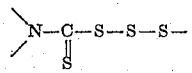

Any variation in this group may result in complete loss of fungicidal activity or efficacy.

The compounds of this invention are effective for the prevention of fungus diseases such as peach brown rot, apple bitter rot, and those caused by other fungi found on trees, grain, flowers, and other plants. They are valuable as disinfectants for seeds such as rice, barley, peas and others. They may also be used in greenhouses to prevent "damping off" or rotting of various plants above the surface of the ground. They may be used to treat seed potatoes for the prevention of "scab" and may be used to treat gladiola bulbs for the prevention of rust. Another application of these compounds is for the impregnation of shoes, tents, textiles, leather items, etc., for the prevention of various mold formations thereon.

The compounds of this invention may be applied for their intended purpose by any suitable method such as by spraying as solutions, suspensions or the like. When used as seed disinfectants they may be mixed with talc or other inert diluent powders and sprinkled or shaken with the seed.

The compounds of the present invention are fungicidal in extremely low concentrations and provide a complete kill on many fungi in concentrations as low as one part per million. A fungicide is considered good if it kills fungus spores at 10 parts per million.

The compounds of the present invention may be obtained from any suitable source. One method for their production comprises reacting alkyl-thiosulfenyl halides with alkali metal salts of dithiocarbamic acids.

Seven day old cultures of *Sclerotinia fructicola* (each brown rot), *Alternaria oleracea* (a blight) and *Glomerella cingulata* (apple bitter rot) were used in the following examples as test organisms. These spores were obtained under controlled conditions.

Spores to be used in tests were transferred from cultures containing the same by adding one ml. of Czapeks solution [1] and 10 ml. of distilled

---

[1] Czapeks solution is a synthetic liquid medium composed of inorganic salts and sugar. It is used as a spore nutrient when the fungi are on the slides. The medium may be solidified by the addition of agar. The formula is as follows:

|  | Grams |
|---|---|
| Magnesium sulfate | 0.50 |
| Dipotassium acid phosphate | 1.00 |
| Potassium chloride | 0.50 |
| Sodium nitrate | 2.00 |
| Ferrous sulfate | 0.01 |
| Cane sugar | 30.00 |
| Distilled water to make 1000 cc. | | water to agar slants and shaking. The resulting suspensions contained enough spores to give 10 to 20 spores per low power field (18X ocular, 16 mm. (10X) objective).

Example I

The spore germination method of evaluating fungicides was used to determine the activity of N,N-dimethyl-S-tert-butylthiosulfenyl dithiocarbamate. A brief account of the procedure is as follows: One drop of a 0.1 per cent solution of the candidate fungicide, prepared by dissolving the compound in a small amount of ethanol and diluting with water to 0.1 per cent, was transferred to each end of a chemically clean microscope slide and allowed to spread to a circle about 5 mm. area. The slide was allowed to dry for 24 to 48 hours protected from dust to assure complete evaporation of solvent. Fungus spores, obtained under controlled conditions, were suspended in distilled water containing a nutrient and added to the fungicide deposit on the slide. A piece of platinum wire about three inches long was sealed to a glass rod and a loop one mm. in diameter formed on the end. The loop was used to transfer the spores to the fungicide deposit on the slide. Spores were always carefully transferred to the center of the fungicide deposit.

Slides so prepared, i. e. containing fungicide deposits with spores deposited thereon were placed in a moisture chamber sealed with distilled water and incubated at 70±2° F. for 24 hours and examined under the low power (180X) of a microscope for germination. Duplicate runs were made in each case to check the results.

After examining the slides under the microscope, if no germination had taken place about ten spores were transferred to an agar slant on a piece of agar about the size of a match head where the fungicide removed with them could diffuse away. When the chemical concentration of the fungicide diminishes enough the spores have the necessary nutrients to germinate if they have not been killed already.

Each slant was incubated at 70±2° F. for 24 hours. Using sterile technique the small piece of agar was removed from the slant, placed on a clean slide and examined under the microscope for spore germination.

Using the procedure outlined above, a 0.1 per cent solution of N,N-dimethyl-S-tert-butylthiosulfenyl dithiocarbamate effected a complete kill on *Sclerotinia fructicola*, *Glomerella cingulata* and *Alternaria oleracea*.

Example II

Slides were prepared by the procedure of Example I using a 0.1 per cent solution of piperidine-S-tert-butylthiosulfenyl dithiocarbamate. This compound effected a complete kill on *Sclerotinia fructicola*, *Glomerella cingulata* and *Alternaria oleracea*.

Example III

Slides were prepared by the procedure of Example I using a 0.1 per cent solution of N,N-diethyl-S-tert-butylthiosulfenyl dithiocarbamate. This compound prevented the germination of *Alternaria oleracea* and *Glomerella cingulata*.

Example IV

An aqueous solution containing 0.1 parts per million of N,N-dimethyl-S-tert-butylthiosulfenyl dithiocarbamate was prepared using the test tube dilution technique. To two cc. of this solution in a chemically clean test tube was added 0.5 cc. of a spore suspension, prepared by diluting a 500,000 per ml. spore suspension with an equal volume of concentrated Czapeks solution, containing approximately 125,000 spores of *Glomerella cingulata*. Mixing was effected by air blowing. One drop of the resulting suspension was transferred to each end of a chemically clean glass microscope slide and the slide placed in a moisture chamber at 70±2° F. Germination counts were made after 20 to 24 hours of incubation. N,N-dimethyl-S-tert-butylthiosulfenyl dithiocarbamate in a concentration of 0.1 part per million prevented the germination of *Glomerella cingulata*.

Example V

Slides were prepared by the procedure of Example IV. Piperidine-S-tert-butylthiosulfenyl dithiocarbamate in a concentration of 0.3 parts per million prevented the germination of *Glomerella cingulata*.

Example VI

Using the test tube dilution technique as described in Example IV, the ED50[1] of N,N-dimethyl-S-tertiary-butyl-thiosulfenyl dithiocarbamate was found to be 1.8 parts per million against *Sclerotinia fructicola*.

Example VII

The following is an account of the infected barley test as a measure of fungicidal activity:

A 9 cm. filter paper is placed in the bottom of a 10 cm. petri dish and varying amounts of chemicals are added. If possible the chemical is dissolved in a solvent such as acetone, alcohol, benzene or water, but if it is insoluble in everything it is suspended either in acetone or water. After the solution or suspension is applied to the paper, the liquid is allowed to evaporate completely so the manner in which it is applied does not enter into the results. Of course, the water solutions need not evaporate since water is to be added later anyway.

The amounts applied to the papers are 5 mg., 1 mg. and 0.1 mg. which corresponds to 0.1%, 0.02% and 0.002% if it would all dissolve in the 5 ml. of water applied to the paper.

Ten grains of barley infected with *Helminthosporium sativum* are placed on the treated papers with about 5 ml. of water and placed at 70° F. to incubate. Two or three checks are set up with no chemical on the paper. Observations are made after 3 and 6 days. In the checks about 90% of the grains of barley become black with the sporulating fungus and the black growth extends onto the paper. Some sprouting of the barley takes place, but the fungus interferes with the growth. On treated paper there is no growth of fungus if the chemical is a good fungicide. The growth, of course, depends on the amount of fungicide present. With good fungicides growth of the fungus on the seeds is also prevented at a sufficient concentration.

Results obtained using N,N-dimethyl-S-tert-butylthiosulfenyl dithiocarbamate and piperidine-S-tert-butylthiosulfenyl dithiocarbamate,

---

[1] ED50 is an abbreviation for the term 50 per cent effective dose i. e. the amount of chemical needed to inhibit the germination and growth of 50 per cent of the fungus spores. The ED50 of a fungicide is determined by employing varying dosages that inhibit between 5 and 95 per cent of the spore germination and growth. These values are plotted on log-probability (probits) paper where the points usually fall near a straight line. The ED50 is then extrapolated from the line or curve as the dosage in parts per million necessary to inhibit the germination and growth of 50 per cent of the fungus spores.

according to the above-described procedure, are recorded below:

| Name | Amt. | On Seeds | On Paper around seeds | Growth Ratio [1] |
|---|---|---|---|---|
| | mg. | | | |
| N,N-Dimethyl-S-tert-butyl-thiosulfenyl dithiocarbamate | 5 | 0 | 0 | 0.1 |
| | 1 | 4 | 0 | 1 |
| | 0.1 | 5 | 0 | 1 |
| Piperidine-S-tert-butylthiosulfenyl dithiocarbamate | 5 | 0 | 0 | 0.05 |
| | 1 | 2 | 0 | 0.7 |
| | 0.1 | 5 | 0 | 1 |
| Check | | 0 | 9 | 6 |
| Check | | 0 | 8 | 6 |

[1] Growth ratio is a comparison of the growth of roots of treated seeds to the growth of roots of fungus free seeds. Fungus free seeds are obtained by treating infected seeds with a known fungicide which is non-phytotoxic. Growth ratios not recorded on checks because the fungus often destroys part or all the roots and provides an unreliable reading.

As the growth ratios indicate, these compounds are phytotoxic to the seeds as well as to the fungus at high concentrations. However, they are nontoxic to seeds at low concentrations at which they retain their fungicidal activity.

Reasonable variation and modification are possible within the foregoing disclosure and the appended claims to the invention the essence of which is that thiosulfenyl dithiocarbamates, as indicated, have been discovered to possess fungicidal activity of considerable value.

We claim:

1. A fungicidal composition having as an essential active ingredient, in a concentration of 0.1 to 1000 parts per million in an inert solvent, a thiosulfenyl dithiocarbamate selected from the group consisting of N,N-dimethyl-S-tert-butylthiosulfenyl dithiocarbamate, piperidine-S-tert-butylthiosulfenyl dithiocarbamate and N,N-diethyl-S-tert-butylthiosulfenyl dithiocarbamate.

2. The composition of claim 1 wherein the solvent is ethanol.

3. The composition of claim 1 wherein the thiosulfenyl dithiocarbamate is N,N-dimethyl-S-tert-butylthiosulfenyl dithiocarbamate.

4. The composition of claim 1 wherein the thiosulfenyl dithiocarbamate is piperidine-S-tert-butylthiosulfenyl dithiocarbamate.

5. The composition of claim 1 wherein the thiosulfenyl dithiocarbamate is N,N-diethyl-S-tert-butylthiosulfenyl dithiocarbamate.

6. The method for preventing a plant disease due to a fungus growth which comprises applying to said plant a thiosulfenyl dithiocarbamate selected from the group consisting of N,N-dimethyl-S-tert-butylthiosulfenyl dithiocarbamate, piperidine-S-tert-butylthiosulfenyl dithiocarbamate and N,N-diethyl-S-tert-butylthiosulfenyl dithiocarbamate.

7. The method of claim 6 wherein the thiosulfenyl dithiocarbamate is N,N-dimethyl-S-tert-butylthiosulfenyl dithiocarbamate.

8. The method of claim 6 wherein the thiosulfenyl dithiocarbamate is piperidine-S-tert-butylthiosulfenyl dithiocarbamate.

9. The method of claim 6 wherein the thiosulfenyl dithiocarbamate is N,N-diethyl-S-tert-butylthiosulfenyl dithiocarbamate.

10. The method for preventing plant disease due to a fungus growth when said fungus is selected from a group consisting of Sclerotinia fructicola, Glomerella cingulata and Alternaria oleracea which comprises applying to said plant a thiosulfenyl dithiocarbamate selected from the group consisting of N,N-dimethyl-S-tert-butylthiosulfenyl dithiocarbamate, piperidine-S-tert-butylthiosulfenyl dithiocarbamate, and N,N-diethyl-S-tert-butylthiosulfenyl dithiocarbamate.

11. The method of claim 10 wherein the thiosulfenyl dithiocarbamate is N,N-dimethyl-S-tert-butylthiosulfenyl dithiocarbamate and the fungus is Sclerotinia fructicola.

12. The method of claim 10 wherein the thiosulfenyl dithiocarbamate is piperidine-S-tert-butylthiosulfenyl dithiocarbamate and the fungus is Sclerotinia fructicola.

13. The method of claim 10 wherein the thiosulfenyl dithiocarbamate is N,N-diethyl-S-tert-butylthiosulfenyl dithiocarbamate and the fungus is Glomerella cingulata.

LYLE D. GOODHUE.
WINSTON M. FLORENCE.

REFERENCES CITED

The following references are of record in the file of this patent:

UNITED STATES PATENTS

| Number | Name | Date |
|---|---|---|
| 1,972,961 | Tisdale et al. | Sept. 11, 1934 |
| 2,139,935 | Claudin | Dec. 13, 1938 |
| 2,325,720 | Urbschat et al. | Aug. 3, 1943 |
| 2,390,713 | Hunt | Dec. 11, 1945 |